(12) United States Patent
Sasaki (10) Patent No.: US 10,429,642 B2
(45) Date of Patent: Oct. 1, 2019

(54) HEAD-UP DISPLAY DEVICE

(71) Applicant: DENSO CORPORATION, Kariya, Aichi-pref. (JP)

(72) Inventor: Tatsuya Sasaki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/761,897

(22) PCT Filed: Sep. 12, 2016

(86) PCT No.: PCT/JP2016/076787
§ 371 (c)(1),
(2) Date: Mar. 21, 2018

(87) PCT Pub. No.: WO2017/051739
PCT Pub. Date: Mar. 30, 2017

(65) Prior Publication Data
US 2018/0267304 A1    Sep. 20, 2018

(30) Foreign Application Priority Data

Sep. 25, 2015   (JP) .................................. 2015-188752
Feb. 24, 2016   (JP) .................................. 2016-033523

(51) Int. Cl.
*G06F 3/041*     (2006.01)
*G09G 3/36*      (2006.01)
(Continued)

(52) U.S. Cl.
CPC .......... *G02B 27/0101* (2013.01); *B60K 35/00* (2013.01); *G02B 27/0149* (2013.01);
(Continued)

(58) Field of Classification Search
CPC ....... G06F 3/1407; G06F 11/00; G09G 3/006; G09G 2320/029; G09G 2320/103;
(Continued)

(56) References Cited

U.S. PATENT DOCUMENTS

2011/0242666 A1    10/2011    Sasaki et al.
2017/0199714 A1*   7/2017    Kim ....................... G09G 3/006

FOREIGN PATENT DOCUMENTS

JP    S64018628 A    1/1989
JP    2011062009 A    3/2011
(Continued)

*Primary Examiner* — Nelson M Rosario
(74) *Attorney, Agent, or Firm* — Harness, Dickey & Pierce, P.L.C.

(57) ABSTRACT

A head-up display device includes an optical unit that includes a drivable reflecting mirror and adjusts a virtual image display position by driving the mirror, a reduction gear mechanism rotatably including transmission gears, a resilient member that generates restoring force in a direction to engage the gears, and a control unit controlling a rotational position of the stepping motor based on an adjustment command by a vehicle occupant. At least one gear predicted to incur a creep deformation is a specific gear. An environmental temperature of the specific gear where the deformation is predicted is a predicted deformation temperature. A deviation predicted to be caused at the display position by the deformation at the predicted deformation temperature is a predicted display deviation. The control unit corrects the rotational position in a direction to reduce the predicted display deviation when the environmental temperature rises to the predicted deformation temperature or higher.

8 Claims, 10 Drawing Sheets

(51) Int. Cl.
  *G02B 27/01* (2006.01)
  *B60K 35/00* (2006.01)
(52) U.S. Cl.
  CPC .. *B60K 2370/334* (2019.05); *B60K 2370/736* (2019.05); *B60R 2300/205* (2013.01); *G02B 2027/0159* (2013.01); *G02B 2027/0181* (2013.01)
(58) Field of Classification Search
  CPC ........... G09G 2330/12; G09G 2354/00; G09G 2370/22; G09G 2380/10; G09G 5/006
  See application file for complete search history.

(56) References Cited

FOREIGN PATENT DOCUMENTS

| | | | |
|---|---|---|---|
| JP | 2011131651 | A | 7/2011 |
| JP | 2011209617 | A | 10/2011 |
| JP | 2012163630 | A | 8/2012 |
| JP | 2014137563 | A | 7/2014 |

\* cited by examiner

HEAD-UP DISPLAY DEVICE

CROSS REFERENCE TO RELATED APPLICATIONS

This application is a U.S. National Phase Application under 35 U.S.C. 371 of International Application No. PCT/JP2016/076787 filed on Sep. 12, 2016 and published in Japanese as WO 2017/051739 A1 on Mar. 30, 2017. This application is based on and claims the benefit of priority from Japanese Patent Application No. 2015-188752 filed on Sep. 25, 2015, and Japanese Patent Application No. 2016-33523 filed on Feb. 24, 2016. The entire disclosures of all of the above applications are incorporated herein by reference.

TECHNICAL FIELD

The present disclosure relates to a head-up display (hereunder referred to as HUD) device installed in a vehicle.

BACKGROUND ART

An HUD device to display a virtual image of a display light image representing vehicle-related information related to a vehicle by projecting the display light image with a projector and reflecting the display light image with a reflecting mirror has heretofore been known widely. By using a reflecting mirror in this way, a space occupied by an HUD device in a vehicle can be reduced substantially.

As such an HUD device, a device that adjusts a position of displaying a virtual image of a display light image by decelerating the rotation of a stepping motor with a reduction gear mechanism, transferring the rotation to a reflecting mirror, and thus driving the reflecting mirror is disclosed in Patent Document 1. In the device disclosed in Patent Document 1, a rotational position of a stepping motor is controlled in accordance with an adjustment instruction from an occupant of a vehicle and resultantly a position of displaying a virtual image of a display light image can be adjusted appropriately to a position expected by the occupant. In addition, in the device disclosed in Patent Document 1, in a reduction gear mechanism, a resilient member generates a restoring force in the direction of engaging transmission gears with each other and resultantly a backlash between the transmission gears disappears. As a result, a deviation caused by a backlash between transmission gears is not easily generated at a position of displaying a virtual image of a display light image.

PRIOR ART DOCUMENT

Patent Document

Patent Document 1: JP 2011-131651 A

With a device disclosed in Patent Document 1 however, the environmental temperature of transmission gears rises in a vehicle. As a result, the transmission gears incur creep deformation in the manner of increasing a backlash at a place where the transmission gears link with each other by engagement. On this occasion, the transmission gears receiving a restoring force of a resilient member rotate so as to reduce the backlash. A position of displaying a virtual image of a display light image therefore deviates undesirably and hence it has been concerned that an occupant may feel a sense of incongruity.

SUMMARY OF INVENTION

The present disclosure addresses the issues described above. Thus, it is an objective of the present disclosure to provide an HUD device inhibiting a position of displaying a virtual image of a display light image from deviating in a vehicle.

To achieve the objective, a head-up display device installed in a vehicle in a first aspect of the present disclosure includes a projector that projects a display light image representing vehicle-related information related to the vehicle, an optical unit that includes a drivable reflecting mirror, which reflects the display light image projected by the projector, and that adjusts a virtual image display position where a virtual image of the display light image reflected by the reflecting mirror is displayed by drive of the reflecting mirror, a stepping motor that rotates to drive the reflecting mirror, a reduction gear mechanism that rotatably includes a plurality of transmission gears, which decelerate the rotation of the stepping motor and transmit the rotation to the reflecting mirror, a resilient member that generates a restoring force in a direction that the plurality of transmission gears are engaged with each other, and a control unit that controls a rotational position of the stepping motor in accordance with an adjustment command by an occupant of the vehicle. At least one of the plurality of transmission gears that is predicted to incur a creep deformation is defined as a specific gear. An environmental temperature of the specific gear, at which the specific gear is predicted to incur the creep deformation, is defined as a predicted deformation temperature. A deviation predicted to be caused at the virtual image display position by the creep deformation at the predicted deformation temperature is defined as a predicted display deviation. The control unit corrects the rotational position in a direction to reduce the predicted display deviation when the environmental temperature rises to the predicted deformation temperature or higher.

In this first aspect, at least one transmission gear where creep deformation is predicted is defined as a specific gear in a reduction gear mechanism and correction triggered by the environmental temperature of the specific gear is given to the rotational position of a stepping motor. Concretely, when an environmental temperature rises to a temperature of a predicted deformation temperature or more at which creep deformation is predicted, the rotational position of a stepping motor is corrected toward the side of reducing a predicted display deviation related to a position of displaying a virtual image of a display light image. Here, a predicted display deviation is a deviation predicted to be generated at a position of displaying a virtual image of a display light image by creep deformation at a temperature of a predicted deformation temperature or more. Even when a specific gear incurs creep deformation at a high environmental temperature of a predicted deformation temperature or more therefore, a position of displaying a virtual image of a display light image can be inhibited from deviating in a vehicle by correcting a rotational position toward the side of reducing a predicted display deviation.

The control unit in a second aspect of the present disclosure includes a correction execution block that executes the correction of the rotational position by a correction amount, which shifts the rotational position in the direction to reduce the predicted display deviation, when the environmental temperature rises to the predicted deformation temperature or higher, and a post-correction control block that controls the rotational position in accordance with the adjustment command, with the rotational position corrected by the correction execution block used as a reference.

In this second aspect, when an environmental temperature rises to a temperature of a predicted deformation temperature or more, a rotational position of a stepping motor shifts toward the side of reducing a predicted display deviation by correcting the rotational position by a correction amount. Then after the shift, the rotational position of the stepping motor is controlled in accordance with an adjustment command with a corrected position used as a reference. As a result, once a rotational position is corrected by an environmental temperature of a predicted deformation temperature or more, a position of displaying a virtual image of a display light image can be controlled in the state of reducing a deviation caused by the creep deformation of a specific gear.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

A plurality of embodiments according to the present disclosure are explained hereunder in reference to the drawings. Here, constituent components corresponding to each other in the embodiments are represented by an identical reference sign and thus a duplicate explanation is avoided sometimes. When only a part of a configuration is explained in an embodiment, a configuration of another embodiment explained previously can be applied to the other part of the relevant embodiment. Further, not only configurations specified in the explanation of an embodiment can be combined but also configurations of a plurality of embodiments can be combined partially with each other even when they are not specified as long as there is no problem with the combination.

First Embodiment

Figure 1:
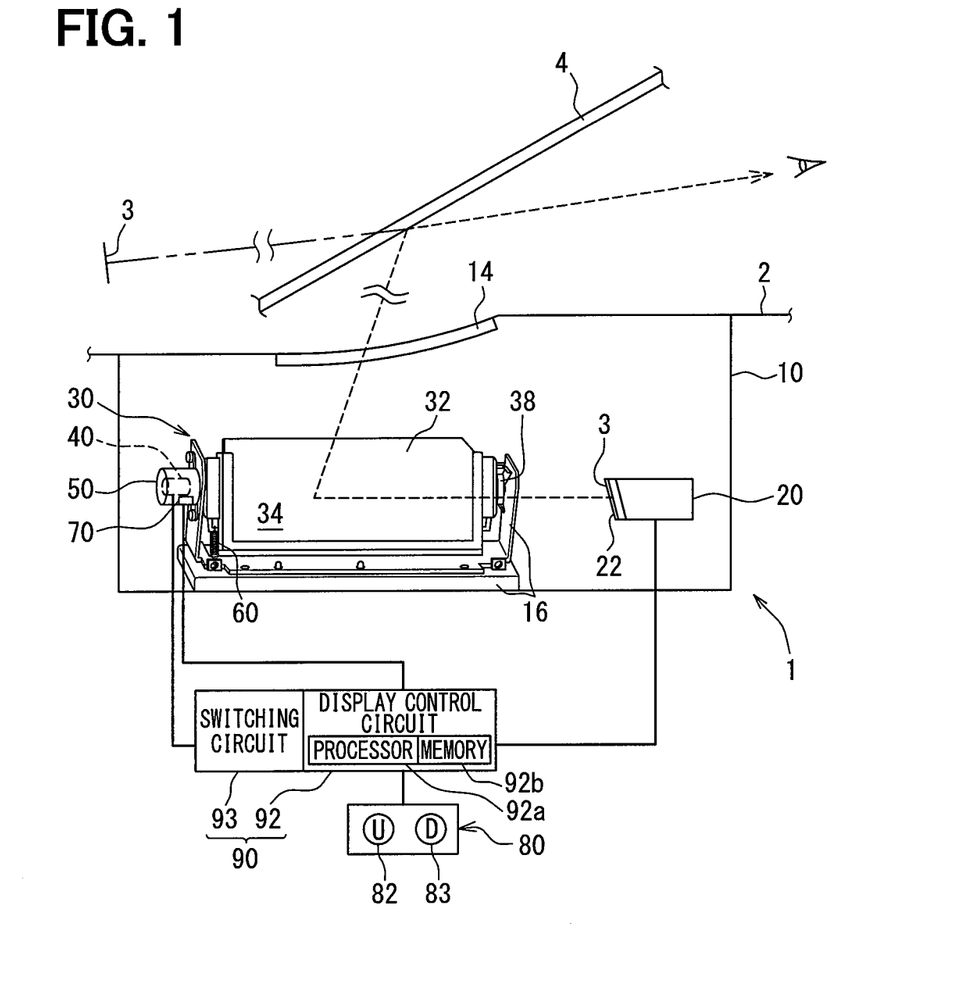
FIG. 1 is a schematic configuration diagram showing an HUD device according to a first embodiment.

As shown in FIG. 1, an HUD device 1 according to a first embodiment is installed in a vehicle and displays a virtual image of a display light image 3 in the vehicle. The HUD device 1 has a housing 10, a projector 20, an optical unit 30, a stepping motor 40, a reduction gear mechanism 50, a resilient member 60, a temperature sensor 70, an adjustment switch 80, and a control unit 90.

The housing 10 has a hollow shape and is installed at an instrument panel 2 in the vehicle. The housing 10 accommodates the constituent components 20, 30, 40, 50, 60, 70, and others of the device 1 in front of the driver's seat in the vehicle. The housing 10 has a translucent light emitting window 14 at a place vertically facing a windshield 4 as a projection member in front of the driver's seat in the vehicle.

Figure 2:
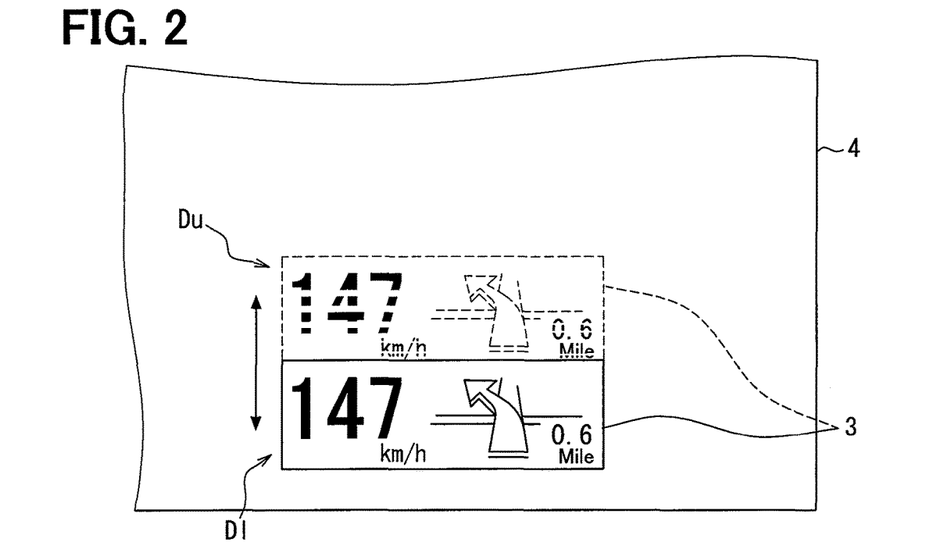
FIG. 2 is a schematic view showing a state of displaying a virtual image of a display light image by the HUD device in FIG. 1.

The projector 20 is mainly composed of a liquid crystal panel or an organic EL panel of a transillumination type or the like and has a screen 22. The screen 22 is transilluminated by a backlight incorporated in the projector 20. An image displayed as a real image on the screen 22 illuminates by receiving the transillumination and thus is projected as a display light image 3. The display light image 3 projected from the projector 20 represents vehicle-related information related to a vehicle. A display light image 3 according to the present embodiment represents navigation information such as a vehicle traveling direction as shown in FIG. 2. Here, a display light image 3 may also represent vehicle state information such as a vehicle speed, a remaining fuel amount, and a cooling water temperature and vehicle exterior situation information such as a traffic situation other than navigation information.

As shown in FIG. 1, the optical unit 30 includes a plurality of optical members including a reflecting mirror 32. Other members than the reflecting mirror 32 however are omitted in FIG. 1. The reflecting mirror 32 has a reflective surface 34 concaved in a smoothly curved surface shape and is a so-called concave mirror. The reflecting mirror 32 expands a display light image 3 entering the reflective surface 34 directly or indirectly from the projector 20 and reflects the display light image 3 toward the side of the light emitting window 14. The display light image 3 reflected in this way passes through the light emitting window 14, is projected to the windshield 4, and thus focuses in front of the windshield 4 as shown in FIG. 2. As a result, the vehicle-related information represented by the display light image 3 is displayed as a virtual image toward the side of the driver's seat in the vehicle.

As shown in FIG. 1, the reflecting mirror 32 has a rotation axis 38. The rotation axis 38 is supported rotatably by a base 16 fixed to the housing 10. By rotationally driving the rotation axis 38, a position of displaying a virtual image of a display light image 3 shifts vertically to the windshield 4 as shown in FIG. 2. In the present embodiment here, a position of displaying a virtual image of a display light image 3 is adjustable between a lower limit display position D1 shown by the solid line in FIG. 2 and an upper limit display position Du shown by the broken line in FIG. 2 due to the optical properties of the optical unit 30 and the windshield 4.

Figure 3:
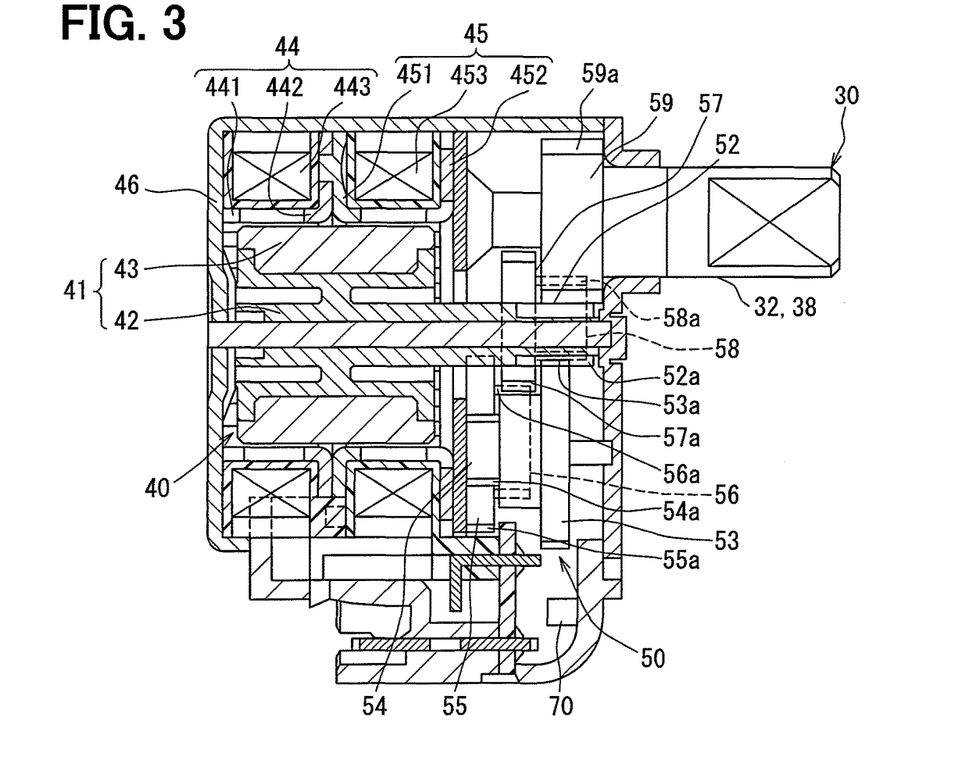
FIG. 3 is a sectional view showing the stepping motor and the reduction gear mechanism in FIG. 1.

As shown in FIG. 3, the stepping motor 40 is a permanent magnet type of a claw pole structure. The stepping motor 40 has a magnetic casing 46, a rotor 41, and stators 44 and 45. The magnetic casing 46 is obtained by forming a magnetic material into a hollow shape. The rotor 41 is formed by assembling a rotor magnet 43 around the outer circumference of a motor shaft 42. The motor shaft 42 is supported rotatably by the magnetic casing 46. The rotor magnet 43 is formed by aligning a plurality of N and S magnetic poles alternately in a rotation direction. The two phase stators 44 and 45 are retained by the magnetic casing 46 on the outer circumferential side of the rotor 41. As shown FIGS. 3 and 4, the stator 44 of an A phase has magnetic yokes 441 and 442 and a coil 443. Likewise, the stator 45 of a B phase has magnetic yokes 451 and 452 and a coil 453.

Figure 5:
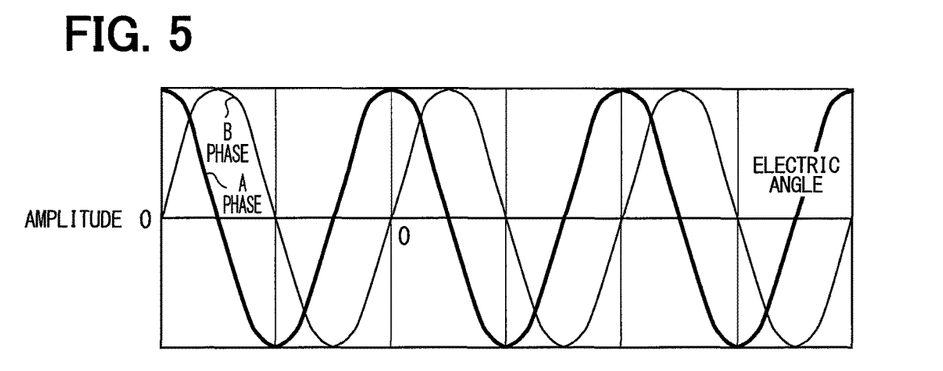
FIG. 5 is a characteristic diagram for explaining a drive signal applied to the stepping motor in FIG. 1.

By this configuration, in the stepping motor 40, the coils 443 and 453 of the respective A and B phases receive electricity by a drive signal and are excited and thus the rotor magnet 43 rotates together with the motor shaft 42. Here, to the coil 443 of the A phase, a drive signal is applied in accordance with a cosine function of alternating an amplitude in response to an electric angle as shown by the thick solid line in the graph of FIG. 5. Likewise, to the coil 453 of the B phase, a drive signal is applied in accordance with a sine function of alternating an amplitude in response to an electric angle as shown by the thin solid line in the graph of FIG. 5. A rotational position of the motor shaft 42 therefore comes to be a position responding to an electric angle of a drive signal applied to the coils 443 and 453 of the respective A and B phases.

As shown in FIG. 3, the reduction gear mechanism 50 shares the magnetic casing 46 with the stepping motor 40. Along with that, the reduction gear mechanism 50 has a plurality of transmission gears 52, 53, 54, 55, 56, 57, 58, and 59 in the interior of the magnetic casing 46. The whole transmission gears 52, 53, 54, 55, 56, 57, 58, and 59 including tooth-shaped portions 52*a*, 53*a*, 54*a*, 55*a*, 56*a*, 57*a*, 58*a*, and 59*a* comprise a resin respectively. In the transmission gears 52, 53, 54, 55, 56, 57, 58, and 59, creep deformation caused by a residual stress during the resin forming and the like is likely to be generated as shown schematically by white allows in FIG. 6A. In the present embodiment therefore, every one of the transmission gears 52, 53, 54, 55, 56, 57, 58, and 59 is defined as a "specific gear" where creep deformation is predicted.

Figure 7:
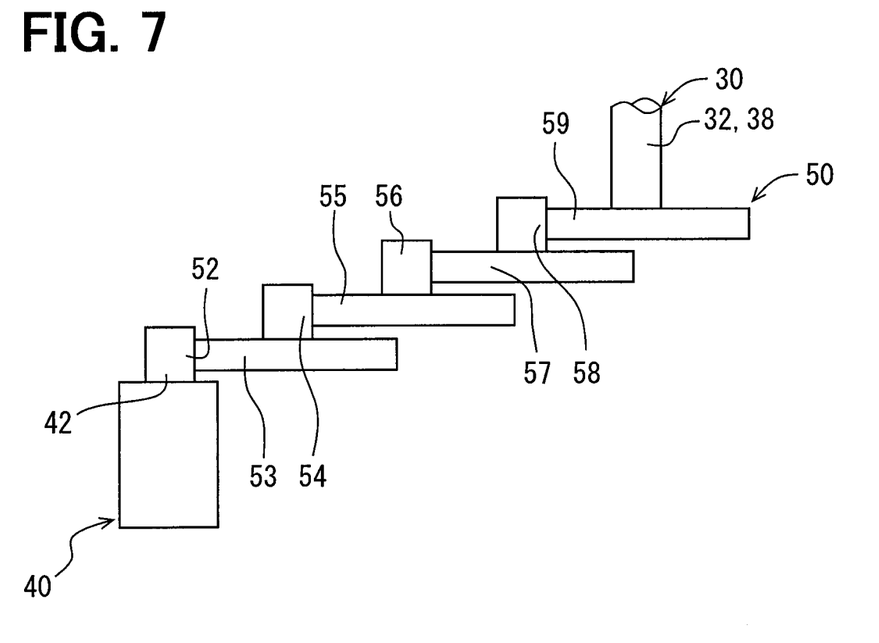
FIG. 7 is a schematic view showing a link relationship between the stepping motor and the reduction gear mechanism in FIG. 1.

As shown in FIGS. 3 and 7, a first stage transmission gear 52 is formed in the motor shaft 42. A first idler transmission gear 53 and a first pinion transmission gear 54 are formed integrally and supported rotatably by the magnetic casing 46. A tooth-shaped portion 53*a* of the first idler transmission gear 53 links with a tooth-shaped portion 52*a* of the first stage transmission gear 52 by engagement. A second idler transmission gear 55 and a second pinion transmission gear 56 are formed integrally and supported rotatably by the magnetic casing 46. A tooth-shaped portion 55*a* of the second idler transmission gear 55 links with a tooth-shaped portion 54*a* of the first pinion transmission gear 54 by engagement. A third idler transmission gear 57 and a third pinion transmission gear 58 are formed integrally and supported rotatably by the magnetic casing 46. A tooth-shaped portion 57*a* of the third idler transmission gear 57 links with a tooth-shaped portion 56*a* of the second pinion transmission gear 56 by engagement. A final stage transmission gear 59 is formed in a rotation shaft 38. A tooth-shaped portion 59*a* of the final stage transmission gear 59 links with a tooth-shaped portion 58*a* of the third pinion transmission gear 58 by engagement.

By this configuration, in the reduction gear mechanism 50, the rotation of the motor shaft 42 is decelerated and transferred to the rotation shaft 38. As a result, when the motor shaft 42 rotates forward, the rotation shaft 38 is driven so that a position of displaying a virtual image of a display light image 3 may shift toward an upward upper limit display position Du as shown in FIG. 2. On the other hand, when the motor shaft 42 rotates backward, the rotation shaft 38 is driven so that a position of displaying a virtual image of a display light image 3 may shift toward a downward lower limit display position Dl as shown in FIG. 2.

As shown in FIG. 1, the resilient member 60 is a so-called tension coil spring comprising a metal. An end of the resilient member 60 is locked by the reflecting mirror 32. The other end of the resilient member 60 is locked by the base 16. By such a locked form, the resilient member 60 generates a restoring force so as to energize the rotation shaft 38 toward one side in a rotation direction. The restoring force comes to be a force generated in the direction of eliminating a backlash by engaging the tooth-shaped portions 52*a*, 53*a*, 54*a*, 55*a*, 56*a*, 57*a*, 58*a*, and 59*a* with each other, those tooth-shaped portions constituting places where the transmission gears 52, 53, 54, 55, 56, 57, 58, and 59 link respectively.

Figure 6A:
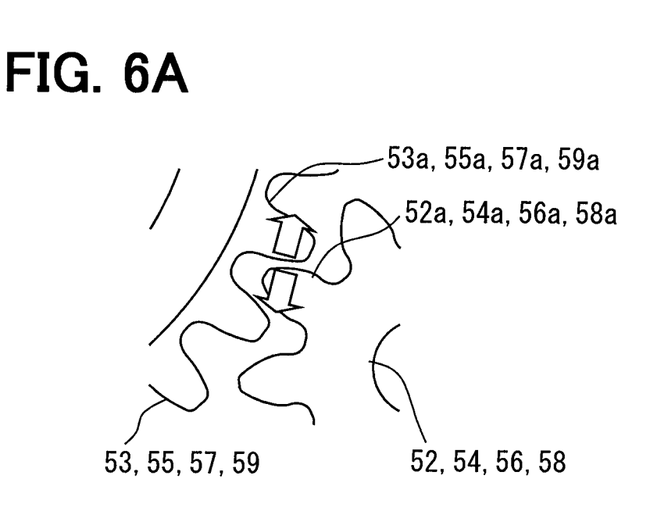
FIG. 6A is a schematic view for explaining creep deformation generated in the transmission gears in FIG. 1
Figure 6B:
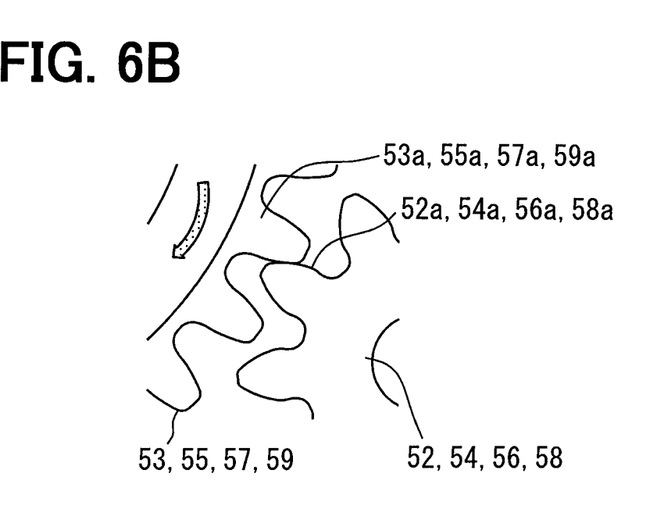
FIG. 6B is a schematic view for explaining creep deformation generated in the transmission gears in FIG. 1.

Here, such creep deformation as shown in FIG. 6A occurs in the manner of bending the teeth of the tooth-shaped portions 52*a*, 53*a*, 54*a*, 55*a*, 56*a*, 57*a*, 58*a*, and 59*a* toward the reciprocal sides at the respective link places. Consequently, the transmission gears 59, 57, 55, and 53 on the latter stage sides: receive the restoring force of the resilient member 60 at the respective link places; thus rotate as shown schematically by the dot-hatched arrow in FIG. 6B; and reduce a backlash to the extent of having increased by the bends of the teeth. As a result, a position of displaying a virtual image of a display light image 3 deviates upward as shown schematically by the white arrow in FIG. 8A. Creep deformation causing such a deviation of a virtual image display position is generated more for a shorter period of time particularly as an environmental temperature T (refer to FIG. 8A) of the transmission gears 52, 53, 54, 55, 56, 57, 58, and 59 rises. The deviation of a virtual image display position therefore is also generated more for a shorter period of time as an environmental temperature T rises.

Figure 8A:
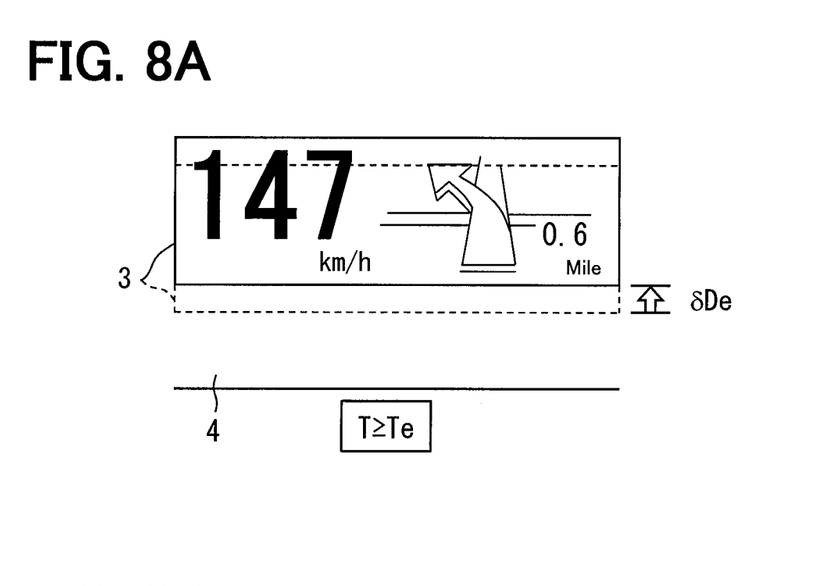
FIG. 8A is a schematic view for explaining a deviation generated at the virtual image display position shown in FIG. 2

In the present embodiment therefore, an environmental temperature T at which a large creep deformation is predicted is defined as a predicted deformation temperature Te (refer to FIG. 8A). Concretely, a predicted deformation temperature Te is set at an environmental temperature T, for example a predetermined value such as 85° C., at which a deviation that gives a sense of incongruity to an occupant in a vehicle is predicted to be generated as a deviation of a virtual image display position caused by creep deformation of the transmission gears 52, 53, 54, 55, 56, 57, 58, and 59. Further, a deviation of a virtual image display position predicted to be generated by creep deformation at such a predicted deformation temperature Te is defined as a predicted display deviation δDe as shown in FIG. 8A. Such a predicted deformation temperature Te and a predicted display deviation δDe may be measured actually from a result of experiment using a plurality of sets of transmission gears 52, 53, 54, 55, 56, 57, 58, and 59 or may be estimated by simulation.

As shown in FIGS. 1 and 3, the temperature sensor 70 is accommodated in the interior of the magnetic casing 46 together with the transmission gears 52, 53, 54, 55, 56, 57, 58, and 59. The temperature sensor 70 therefore is installed at the instrument panel 2 in a vehicle. The temperature sensor 70 is mainly composed of a thermistor that changes an electric resistance relatively largely in response to the change of a temperature. The temperature sensor 70 detects an environmental temperature T common to the transmission gears 52, 53, 54, 55, 56, 57, 58, and 59 in the interior of the magnetic casing 46. The temperature sensor 70 outputs a temperature signal representing a detected environmental temperature T.

Figure 4:
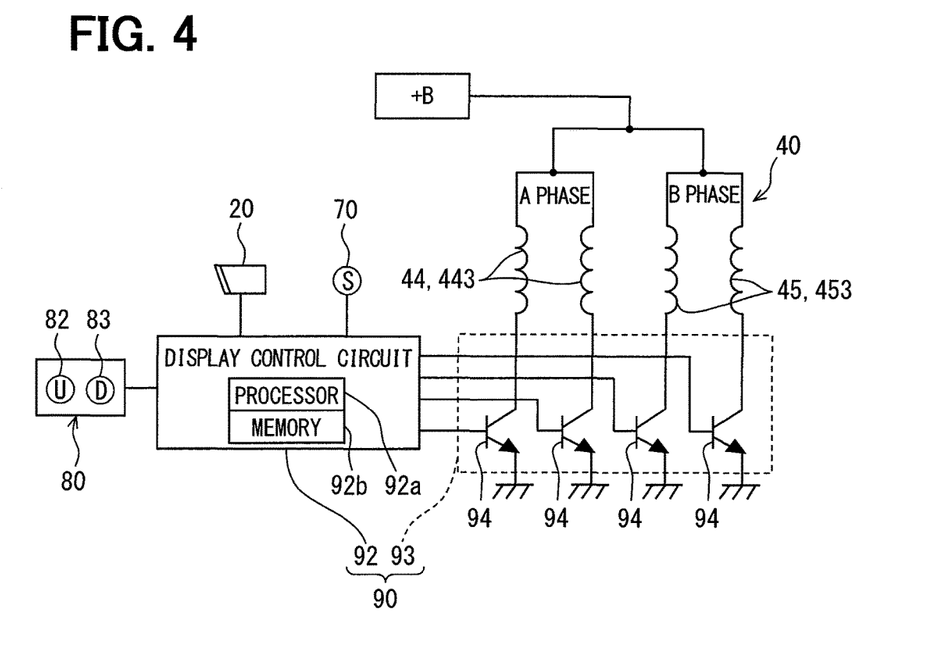
FIG. 4 is an electric circuit diagram showing a state of electrically connecting the stepping motor to the control unit in FIG. 1.

As shown in FIGS. 1 and 4, the adjustment switch 80 is installed around a driver's seat in a vehicle so as to be operable by an occupant. The adjustment switch 80 has operation members 82 and 83 of a lever type, a push type, or the like. An up operation member 82 is operated by an occupant who wants to shift a position of displaying a virtual image of a display light image 3 upward. By receiving the operation, the adjustment switch 80 outputs a command signal to give an up adjustment command. In contrast, a down operation member 83 is operated by an occupant who wants to shift a position of displaying a virtual image of a display light image 3 downward. By receiving the operation, the adjustment switch 80 outputs a command signal to give a down adjustment command.

The control unit 90 is installed in the exterior or the interior of the housing 10. The control unit 90 is formed by combining a display control circuit 92 and a switching circuit 93. The display control circuit 92 is mainly composed of a microcomputer having a processor 92a and a memory 92b. The display control unit 92 is connected electrically to the projector 20, the temperature sensor 70, and the adjustment switch 80. As shown in FIG. 4, the switching circuit 93 has a plurality of transistors as switching elements 94. Collectors of the switching elements 94 are connected electrically to either of the coils 443 and 453. Emitters and bases of the switching elements 94 are connected electrically to an earth terminal of a vehicle and the display control circuit 92 respectively. The switching elements 94 change stepwise a drive signal applied to the coils 443 and 453 of the respective A and B phases in accordance with a base signal inputted from the display control circuit 92. As a result, the rotational position of the motor shaft 42 shifts in response to an electric angle of the drive signal applied to the coils 443 and 453 of the respective A and B phases. Then the control of a base signal sent to the switching elements 94 is explained hereunder as the control of a rotational position of the motor shaft 42.

In the control unit 90 of such a configuration, the display control circuit 92 controls the display of an image projected by the projector 20. Along with this, the display control circuit 92 controls a rotational position of the motor shaft 42 in accordance with a temperature signal inputted from the temperature sensor 70 and a command signal inputted from the adjustment switch 80.

Concretely, the display control circuit 92 shifts a rotational position of the motor shaft 42 toward the forward rotation side in accordance with an up adjustment command by the operation of the up operation member 82. As a result, a position of displaying a virtual image of a display light image 3 shifts upward in accordance with the up adjustment command. On the other hand, the display control circuit 92 shifts a rotational position of the motor shaft 42 toward the backward rotation side in accordance with a down adjustment command by the operation of the down operation member 83. As a result, a position of displaying a virtual image of a display light image 3 shifts downward in accordance with the down adjustment command. Here, in the following explanations, an up adjustment command and a down adjustment command are referred collectively to as an adjustment command.

Figure 9:
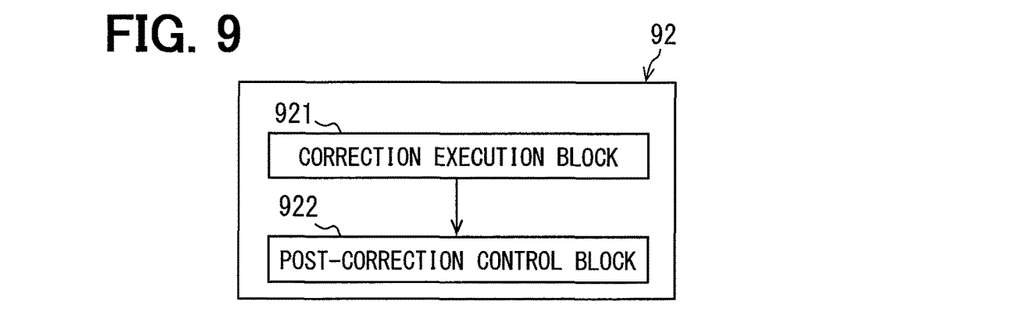
FIG. 9 is a block diagram showing a plurality of blocks constituting the display control circuit in FIG. 1.

Further, the display control circuit 92 controls a rotational position of the motor shaft 42 in response to an environmental temperature T detected by the temperature sensor 70. Then rotational position control responding to an environmental temperature T is hereunder explained in detail. The display control circuit 92: executes a control program stored in the memory 92b in order to carry out rotational position control responding to an environmental temperature T by the processor 92a; and thus builds a plurality of blocks 921 and 922 shown in FIG. 9 functionally.

Figure 8B:
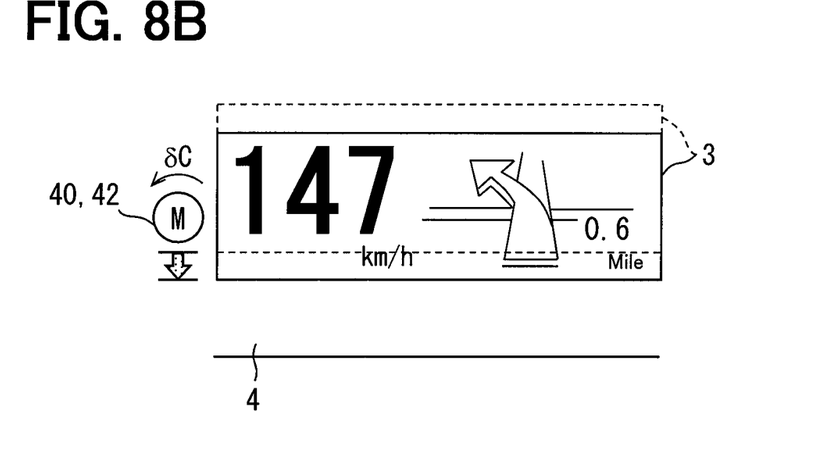
FIG. 8B is a schematic view for explaining correction for returning the deviation.

When an environmental temperature T detected by the temperature sensor 70 rises to a temperature of a predicted deformation temperature Te or more, the correction execution block 921 corrects a rotational position of the motor shaft 42 by a predetermined correction amount δC (refer to FIG. 8B). In particular, the correction execution block 921 according to the present embodiment corrects a rotational position by a correction amount δC when an environmental temperature T detected by the temperature sensor 70 rises to a temperature of a predicted deformation temperature Te or more for the first time after the HUD device 1 is installed in a vehicle.

On this occasion, a correction amount δC is set on the backward rotation side of the motor shaft 42 so as to reduce a predicted display deviation δDe at a temperature of a predicted deformation temperature Te or more by shifting a position of displaying a virtual image of a display light image 3 downward as schematically shown by a dot-hatched arrow in FIG. 8B. Here therefore, a correction amount δC is set at a variation of rotating the motor shaft 42 backward in order to return a predicted display deviation δDe to the state before deviation, for example a predetermined value of 360 degrees corresponding to two steps, as an electric angle variation of a drive signal applied to the coils 443 and 453 of the respective A and B phases.

Such a correction amount δC is set beforehand at a value of shifting a rotational position of the motor shaft 42 toward the backward rotation side so as to return a predicted display deviation δDe actually measured or estimated as stated earlier to the state before deviation and stored in the memory 92b. Then the correction execution block 921 reads out the correction amount δC stored in the memory 92b and thus corrects the rotational position by the correction amount δC. As a result, an electric angle of a drive signal applied to the coils 443 and 453 of the respective A and B phases shifts to the extent corresponding to the correction amount δC. The rotational position of the motor shaft 42 is therefore corrected toward the backward rotation side of returning the predicted display deviation δDe to the state before deviation.

Here, once an environmental temperature T rises to a temperature of a predicted deformation temperature Te or more, the residual stresses of the transmission gears 52, 53, 54, 55, 56, 57, 58, and 59 reduce rapidly. The creep deformations of the transmission gears 52, 53, 54, 55, 56, 57, 58, and 59 therefore can be fictionalized as not generated substantially after the rotational position is corrected by the correction execution block 921.

Then when a first adjustment command is given after a rotational position is corrected, the post-correction control block 922 controls the rotational position of the motor shaft 42 from a current position corrected by a correction amount δC to a position following the first adjustment command. Further, when a second or subsequent adjustment command is given after the rotational position is corrected, the post-correction control block 922 controls the rotational position of the motor shaft 42 from a current position controlled through the position corrected by the correction amount δC to a position following the second or subsequent adjustment command. By the above control, once a rotational position of the motor shaft 42 is corrected in response to the rise of an environmental temperature T to a temperature of a predetermined deformation temperature Te or more, the rotational position of the motor shaft 42 is controlled on the basis of the corrected position.

Figure 10:
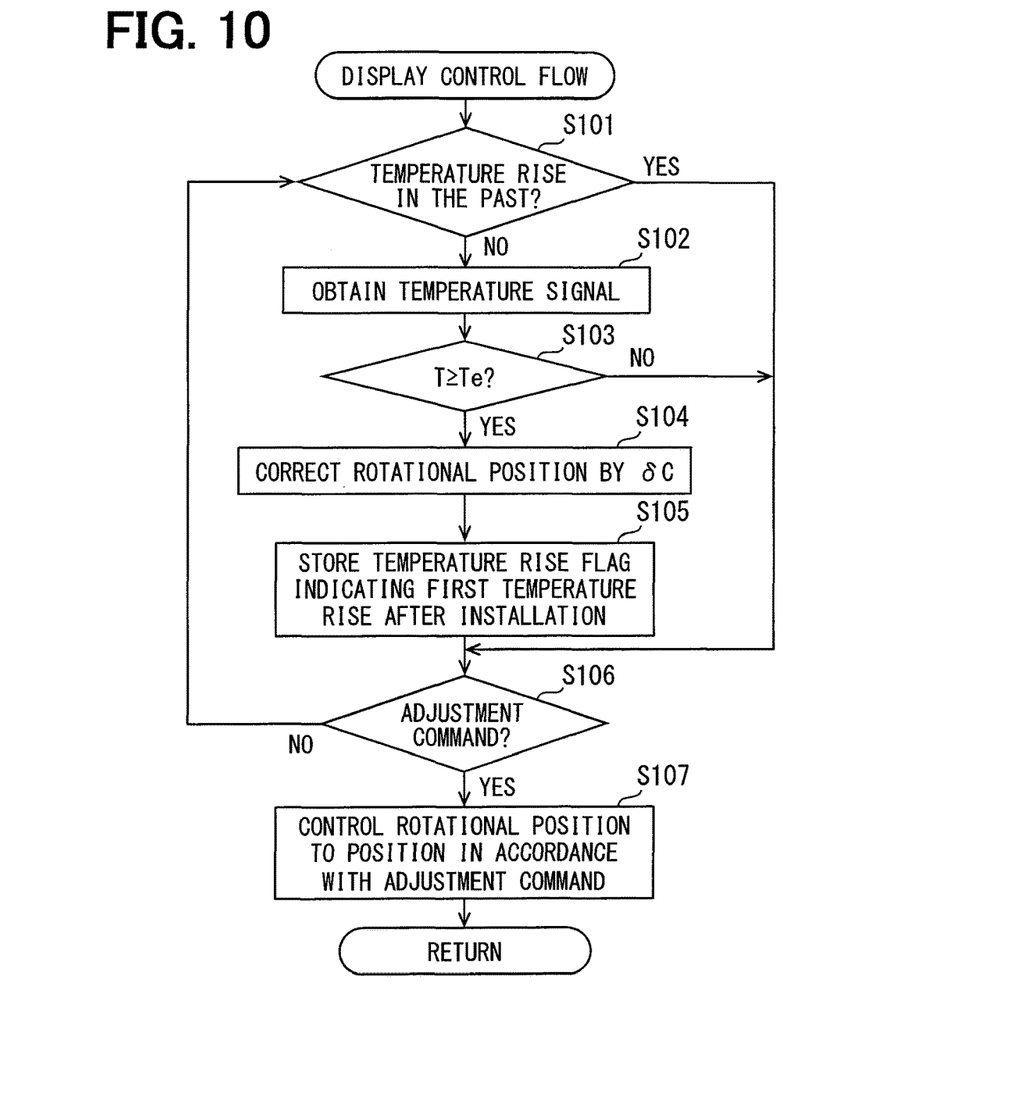
FIG. 10 is a flowchart showing a display control flow in the display control circuit in FIG. 1.

By building such multiple blocks 921 and 922 and the like, the display control circuit 92 executes a display control flow shown in FIG. 10 and then the details are explained hereunder. Here, the display control flow starts in response to on operation of a power switch of a vehicle and finishes in response to off operation of the switch. Further, during the display control flow, a virtual image of a display light image 3 continues to be displayed by projecting the display light image 3 from the projector 20. Here, "S" in the display control flow means a step.

At S101 in the display control flow, whether or not an environmental temperature T has ever risen to a temperature of a predicted deformation temperature Te or more is determined on the basis of contents stored in the memory 92*b*. When negative determination is given as a result, the process shifts to S102.

At S102, a temperature signal representing an environmental temperature T detected by the temperature sensor 70 is obtained. Successively, at S103, whether or not the environmental temperature T detected by the temperature sensor 70 is the predicted deformation temperature Te or more is determined on the basis of the temperature signal obtained at immediately preceding S102. When positive determination is given as a result, the process shifts to S104.

At S104, as a function of the correction execution block 921, a rotational position of the motor shaft 42 is corrected by a correction amount δC stored in the memory 92*b*. At succeeding S105, a temperature rise flag representing that an environmental temperature T has risen to a temperature of a predicted deformation temperature Te or more for the first time after the device is installed in a vehicle is stored in the memory 92*b*. Here, once the temperature rise flag is stored in the memory 92*b*, the temperature rise flag is not deleted regardless of on or off operation of a power switch as long as the initialization of the memory 92*b* is not forced from an exterior. At S101 that is repeated by returning from S106 or S107 as described later after the execution of S105 therefore, positive determination is given on the basis of the temperature rise flag stored in the memory 92*b*. On the contrary, before the execution of S105, the temperature rise flag is not stored in the memory 92*b* and hence negative determination is given at S101.

Meanwhile, after the execution of S105, the process shifts to S106. Further, also when negative determination is given at S103, the process shifts to S106. Furthermore, even when positive determination is given at S101, the process shifts to S106. Here, when the process shifts from any of S101, S103, and S105, at S106, whether or not an adjustment command is given by an occupant is determined on the basis of the existence or non-existence of a command signal from the adjustment switch 80. When negative determination is given as a result, the process returns to S101. On the other hand, when positive determination is given, the process shifts to S107.

At S107, as a function of the post-correction control block 922, a rotational position of the motor shaft 42 is controlled to a position conforming to an adjustment command and then the process returns to S101. At S107 of first time after the shift from S105 to S106 therefore, a rotational position of the motor shaft 42 is controlled from a current position corrected at S105. Further, at S107 of second time shift after the shift from S105 to S106, a rotational position of the motor shaft 42 is controlled from a current position controlled through a position corrected at S104.

Operational advantages of the first embodiment explained heretofore are explained hereunder.

According to the first embodiment, in the reduction gear mechanism 50, the transmission gears 52, 53, 54, 55, 56, 57, 58, and 59 where creep deformation is predicted are defined as "specific gears" and correction triggered by an environmental temperature T of the gears is given to a rotational position of the stepping motor 40. Concretely, when an environmental temperature T rises to a temperature of a predicted deformation temperature Te or more at which creep deformation is predicted, a rotational position of the stepping motor 40 is corrected toward the side of returning a predicted display deviation δDe related to a position of displaying a virtual image of a display light image 3 to the state before deviation. Here, the predicted display deviation δDe is a deviation estimated to be generated at a position of displaying a virtual image of a display light image 3 by creep deformation at a predicted deformation temperature Te. Even when the transmission gears 52, 53, 54, 55, 56, 57, 58, and 59 incur creep deformation at an environmental temperature T of a predicted deformation temperature Te or more therefore, by correcting a rotational position toward the side of returning the predicted display deviation δDe to the state before deviation, a position of displaying a virtual image of a display light image 3 can be inhibited from deviating in a vehicle.

Further, when an environmental temperature T rises to a temperature of a predicted deformation temperature Te or more, a rotational position of the stepping motor 40 shifts toward the side of returning a predicted display deviation δDe to the state before deviation by correcting the rotational position by a correction amount δC. After the shift therefore, the rotational position of the stepping motor 40 is controlled in accordance with an adjustment command on the basis of the corrected position. As a result, once a rotational position is corrected at an environmental temperature T of a predicted deformation temperature Te or more, a position of displaying a virtual image of a display light image 3 can be controlled while the state of reducing deviation caused by the creep deformation of the transmission gears 52, 53, 54, 55, 56, 57, 58, and 59 is maintained.

Furthermore, an environmental temperature T of the transmission gears 52, 53, 54, 55, 56, 57, 58, and 59 is likely to rise to a temperature of a predicted deformation temperature Te or more by the travel of a vehicle in which the HUD device 1 is installed. In the HUD device 1 therefore, when an environmental temperature T rises to a temperature of a predicted deformation temperature Te or more for the first time after the installation in the vehicle, a rotational position is corrected. As a result, the situation that creep deformation may be generated in the transmission gears 52, 53, 54, 55, 56, 57, 58, and 59 can be captured without fail and the rotational position can be corrected timely. Consequently, the reliability of the effect of inhibiting a position of displaying a virtual image of a display light image 3 from deviating can be ensured.

Moreover, the temperature sensor 70 is accommodated in the interior of the magnetic casing 46 of the reduction gear mechanism 50 together with the transmission gears 52, 53, 54, 55, 56, 57, 58, and 59. The temperature sensor 70 can detect an environmental temperature T of the transmission gears 52, 53, 54, 55, 56, 57, 58, and 59 as close as possible with a high degree of accuracy. Consequently, the rise of an environmental temperature T to a temperature of a predicted deformation temperature Te or more can be captured accurately and a rotational position can be corrected timely. For the reason, a situation that a rotational position is corrected and inversely a position of displaying a virtual image of a display light image 3 deviates undesirably in spite of the fact that a predicted display deviation δDe requiring rotational position correction is not generated can be inhibited.

In addition, in the transmission gears 52, 53, 54, 55, 56, 57, 58, and 59, the whole of them including the tooth-shaped portions 52a, 53a, 54a, 55a, 56a, 57a, 58a, and 59a comprising a resin respectively, creep deformation is likely to be generated at a temperature of a predicted deformation temperature Te or more. Even when the transmission gears 52, 53, 54, 55, 56, 57, 58, and 59 incur creep deformation at an environmental temperature T of a predicted deformation temperature Te or more however, by correcting a rotational position toward the side of returning a predicted display deviation δDe to the state before deviation, a position of displaying a virtual image of a display light image 3 can be inhibited from deviating.

Second Embodiment

Figure 11:
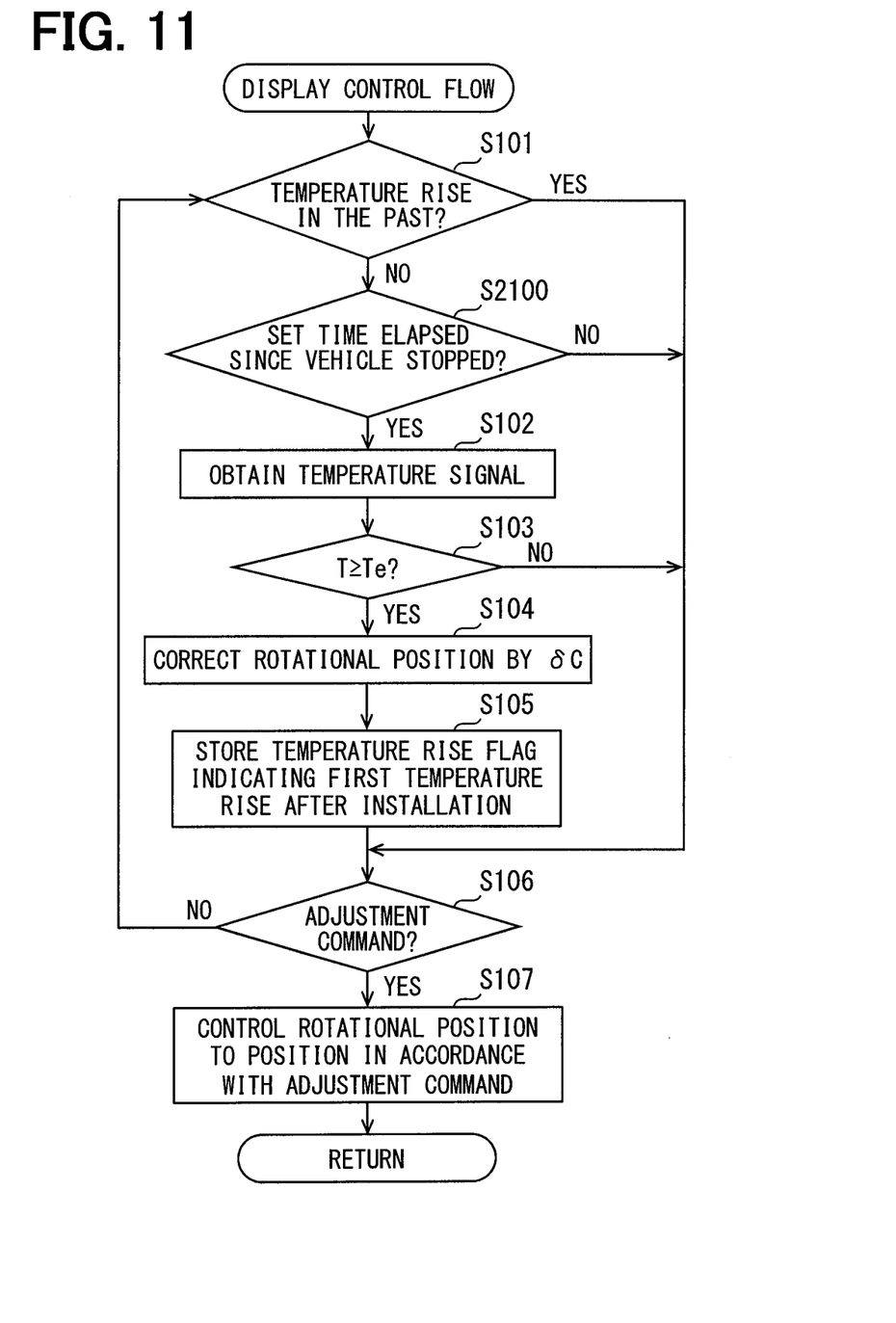
FIG. 11 is a flowchart showing a display control flow in a display control circuit according to a second embodiment.

A second embodiment is a modification of the first embodiment. In the second embodiment, S2100 is added to a display control flow as shown in FIG. 11.

A process shifts to S2100 when negative determination is given at S101. At S2100, whether or not a set time has elapsed since a vehicle stopped is determined. Here, a set time is set at a time required for raising an environmental temperature T detected by the temperature sensor 70 to the utmost and saturating the environmental temperature T in a vehicle because the vehicle stops and thus an air conditioner and the like stop. When negative determination is given at S2100, the process shifts to S106. On the other hand, when positive determination is given at S2100, the process shifts to S102.

According to the second embodiment, when an environmental temperature T in a vehicle rises to a temperature of a predicted deformation temperature Te or more after the stop of the vehicle, a rotational position is corrected. As a result, on the basis of the finding that an environmental temperature T is likely to rise to the utmost after the stop of the travel of a vehicle, the situation that creep deformation may be generated in the transmission gears 52, 53, 54, 55, 56, 57, 58, and 59 can be captured without fail and the rotational position can be corrected timely. Consequently, the reliability of the effect of inhibiting a position of displaying a virtual image of a display light image 3 from deviating can be ensured.

Third Embodiment

A third embodiment is a modification of the second embodiment. In the third embodiment, S3104a and S3104b are executed in place of S104 in a display control flow as shown in FIG. 12.

Firstly, a process shifts to S3104a when positive determination is given at S103. At S3104a, which of a plurality of temperature ranges of δT1, δT2, and δT3 of a predicted deformation temperature Te or more an environmental temperature T detected by the temperature sensor 70 corresponds to is determined on the basis of a temperature signal obtained at the closest S102. In the present embodiment here, three temperature ranges δT1, δT2, and δT3 are set. The temperature ranges δT1, δT2, and δT3 are set with temperatures that are predicted to cause notable differences in a predicted display deviation δDe felt by an occupant defined as boundaries on the basis of a temperature correlation It between an environmental temperature T of a predicted deformation temperature Te or more and a predicted display deviation δDe as shown in FIG. 13. In the present embodiment in particular, the temperature ranges δT1, δT2, and δT3 are set on the basis of a temperature correlation It of increasing a predicted display deviation δDe in proportion to the rise of an environmental temperature T.

Figure 12:
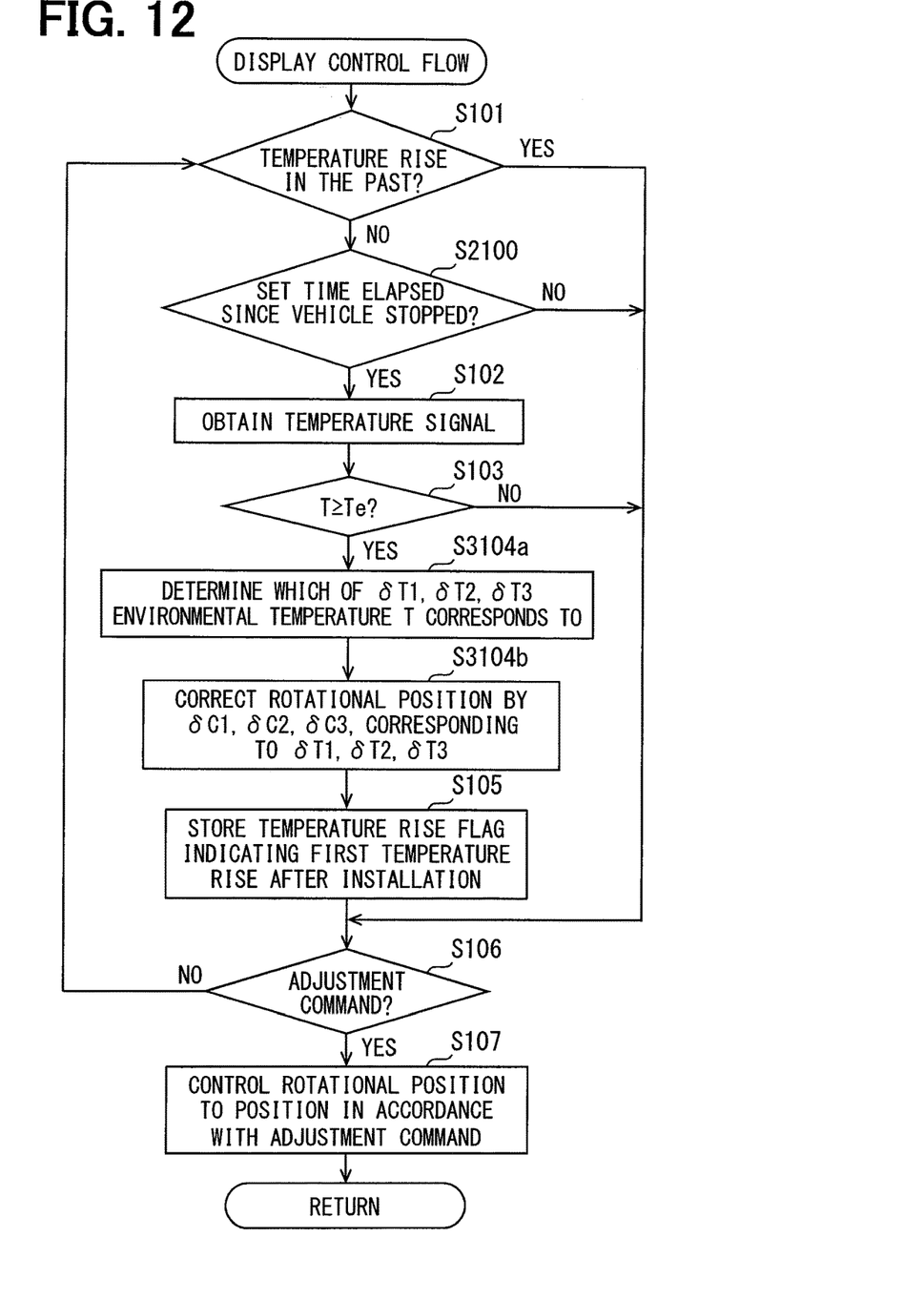
FIG. 12 is a flowchart showing a display control flow in a display control circuit according to a third embodiment.
Figure 13:
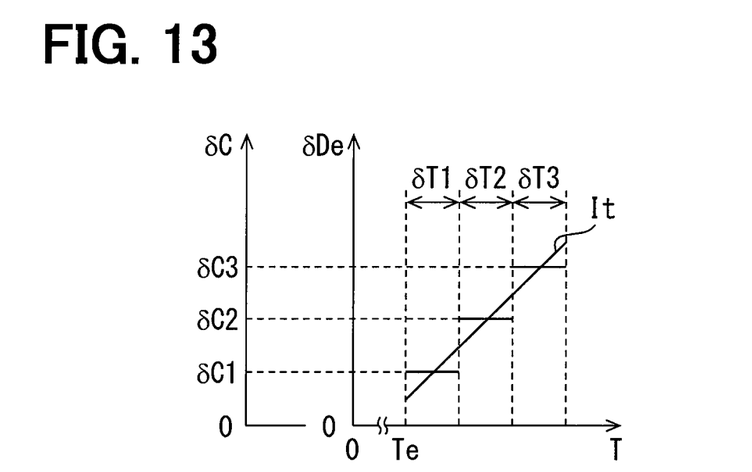
FIG. 13 is a characteristic diagram for explaining correction by a display control circuit according to the third embodiment.

Successively, the process shifts to S3104b after the temperature ranges δT1, δT2, and δT3 are determined at S3104a as shown in FIG. 12. At S3104b, a rotational position of the motor shaft 42 is corrected by any one of a plurality of values δC1, δC2, and δC3 that are variable correction amounts δC stored in the memory 92b as a function of the correction execution block 921. In the present embodiment here, three correction amounts δC1, δC2, and δC3 are set in response to the three temperature ranges δT1, δT2, and δT3. The correction amounts δC1, δC2, and δC3 are set at different values corresponding to the temperature ranges δT1, δT2, and δT3 respectively on the basis of a temperature correlation It between an environmental temperature T of a predicted deformation temperature Te or more and a predicted display deviation δDe as shown in FIG. 13. In the present embodiment in particular, the correction amounts δC1, δC2, and δC3 are set so as to increase the values in proportion to the rise of the relevant temperature ranges δT1, δT2, and δT3. Then at S3104b, a value corresponding to any one of the temperature ranges δT1, δT2, and δT3 determined at immediately preceding S3104a is selected from the correction amounts δC1, δC2, and δC3 and a rotational position is corrected by the selected value. Here, when the correction of the rotational position finishes at S3104b, the process shifts to S105.

According to the third embodiment, a rotational position is corrected by variable correction amounts δC1, δC2, and δC3 based on a temperature correlation It between an environmental temperature T of a predicted deformation temperature Te or more and a predicted display deviation δDe. As a result, appropriate correction amounts δC1, δC2, and δC3: are selected in consideration of even the general knowledge that a predicted display deviation δDe varies in response to an environmental temperature T; and can be used for rotational position correction. Consequently, the reliability of the effect of inhibiting a position of displaying a virtual image of a display light image 3 from deviating can be ensured.

Further, according to the third embodiment, a rotational position is corrected by a value corresponding to a relevant range of an environmental temperature T in the correction amounts δC1, δC2, and δC3 which are set at different values in accordance with the multiple temperature ranges δT1, δT2, and δT3 of a predicted deformation temperature Te or more on the basis of a temperature correlation It. As a result, correction amounts δC1, δC2, and δC3 appropriate to temperature ranges δT1, δT2, and δT3 that are predicted to cause notable differences in a predicted display deviation δDe felt by an occupant are selected respectively and can be used for rotational position correction. Consequently, a high degree of reliability in the effect of inhibiting a position of displaying a virtual image of a display light image 3 from deviating can be ensured.

Although several embodiments have heretofore been explained, the present disclosure should not be construed as limited to those embodiments and can apply to various embodiments in the range not departing from the gist of the present disclosure. Modifications of the above embodiments are explained.

Concretely, in a first modification according to the first to third embodiments, a rotational position may be corrected by the correction execution block 921 when an environmental temperature T detected by the temperature sensor 70 comes to be a temperature of a predicted deformation temperature Te or more for the first time after production or after factory shipment before the HUD device 1 is installed in a vehicle. In a second modification according to the first to third embodiments, at least a part of the multiple blocks 921 and 922 may be configured as hardware by at least one IC or the like.

In a third modification according to the first to third embodiments, a zero position serving as a reference for controlling a rotational position of the motor shaft 42 may be set. In the third modification, after a current position and a zero position of a rotational position of the motor shaft 42 are corrected by a fixed correction amount δC or variable correction amounts δC1, δC2, and δC3, control may be executed so as to follow an adjustment command with the corrected zero position used as a reference.

In a fourth modification according to the first to third embodiments, gears excluding at least one of the transmission gears 52, 53, 54, 55, 56, 57, 58, and 59 may comprise a material that does not generate creep deformation easily even when an environmental temperature T comes to be a temperature of a predicted deformation temperature Te or more. In the fourth modification, at least one transmission gear comprising a resin similarly to the above embodiments is defined as a "specific gear".

In a fifth modification according to the first to third embodiments, with regard to at least one gear defined as a "specific gear" in the transmission gears 52, 53, 54, 55, 56, 57, 58, and 59, only the tooth-shaped portions 52a, 53a, 54a, 55a, 56a, 57a, 58a, and 59a or parts including the tooth-shaped portions 52a, 53a, 54a, 55a, 56a, 57a, 58a, and 59a may comprise a resin.

In a sixth modification according to the first to third embodiments, at least one gear defined as a "specific gear" in the transmission gears 52, 53, 54, 55, 56, 57, 58, and 59 may comprise a material other than a resin as long as creep deformation causing a virtual image display position to be deviated to the extent of giving a sense of incongruity to an occupant is generated.

In a seventh modification according to the first to third embodiments, a torsion spring of various kinds, such as a torsion coil spring or a spiral spring, may be adopted as the resilient member 60. In an eighth modification according to the first to third embodiments, any one of the shafts of the transmission gears 53, 54, 55, 56, 57, and 58 or the motor shaft 42 may be energized by the resilient member 60. In the eighth modification, similarly to the above embodiments, the resilient member 60 generates a restoring force in a direction of engaging the tooth-shaped portions 52a, 53a, 54a, 55a, 56a, 57a, 58a, and 59a constituting the respective link places of the transmission gears 52, 53, 54, 55, 56, 57, 58, and 59 with each other.

In a ninth modification according to the first to third embodiments, a thermometer of various kinds, of a thermocouple type or an infrared type, may be adopted as the temperature sensor 70. In a tenth modification according to the first to third embodiments, the temperature sensor 70 may be installed outside the magnetic casing 46 in the interior of the housing 10. In an eleventh modification according to the first to third embodiments, the temperature sensor 70 may be installed outside the housing 10. In a twelfth modification according to the first to third embodiments, an environmental temperature T may be detected by a temperature sensor installed at a place different from the HUD device 1 in a vehicle, such as a room temperature sensor of an air conditioner, in place of the temperature sensor 70 exclusively used in the HUD device 1 like the above embodiments.

In a thirteenth modification according to the first to third embodiments, a laser scanner of projecting a laser light forming a display light image 3 by an electromechanical system, a video display system of projecting a visible light or a laser light forming a display light image 3 by a digital mirror device, or the like may be adopted as the projector 20. In a fourteenth modification according to the first to third embodiments, a display light image 3 may be projected toward a combiner or the like installed exclusively for the HUD device 1 in a vehicle.

In a fifteenth modification according to the second and third embodiments, a display control flow may be changed so as to correct a rotational position when an environmental temperature T in a vehicle rises to a temperature of a predicted deformation temperature Te or more during the travel of the vehicle. In the display control flow according to the fifteenth modification, whether or not a vehicle is in a traveling state is determined at S2100 and, when positive determination is given, the process shifts to S102.

In a sixteenth modification according to the third embodiment, the number of sets of temperature ranges and correction amounts may be set at two or four or more in place of three described above. In a display control flow of a seventeenth modification according to the third embodiment, similarly to the first embodiment, without executing S2100, when negative determination is given at S101, the process may shift to S102.

Figure 14:
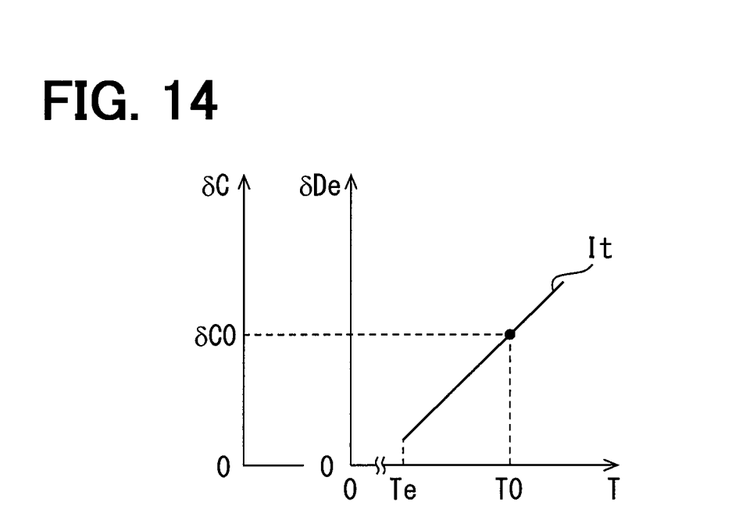
FIG. 14 is a characteristic diagram for explaining correction by a display control circuit according to a modification.

In an eighteenth modification according to the third embodiment, as shown in FIG. 14, a value δC0 that is a correction amount δC corresponding to a value T0 as an environmental temperature T one to one on the basis of a temperature correlation It of increasing a predicted display deviation δDe in proportion to the rise of an environmental temperature T may be used for correcting a rotational position. In the display control flow of the eighteenth modification, without executing S3104a, a rotational position is corrected at S3104b by a correction amount δC0 corresponding to an environmental temperature T0 based on a signal obtained at S102.

While the present disclosure has been described with reference to embodiments thereof, it is to be understood that the disclosure is not limited to the embodiments and constructions. The present disclosure is intended to cover various modification and equivalent arrangements. In addition, the various combinations and configurations, other combinations and configurations, including more, less or only a single element, are also within the spirit and scope of the present disclosure.

The invention claimed is:

1. A head-up display device installed in a vehicle, comprising:
   a projector that projects a display light image representing vehicle-related information related to the vehicle;
   an optical unit that includes a drivable reflecting mirror, which reflects the display light image projected by the projector, and that adjusts a virtual image display position, where a virtual image of the display light image reflected by the reflecting mirror is displayed, by drive of the reflecting mirror;

a stepping motor that rotates to drive the reflecting mirror;

a reduction gear mechanism that rotatably includes a plurality of transmission gears, which decelerate the rotation of the stepping motor and transmit the rotation to the reflecting mirror;

a resilient member that generates a restoring force in a direction that the plurality of transmission gears are engaged with each other; and a control unit that controls a rotational position of the stepping motor in accordance with an adjustment command by an occupant of the vehicle, wherein:

at least one of the plurality of transmission gears that is predicted to incur a creep deformation is defined as a specific gear;

an environmental temperature of the specific gear, at which the specific gear is predicted to incur the creep deformation, is defined as a predicted deformation temperature;

a deviation predicted to be caused at the virtual image display position by the creep deformation at the predicted deformation temperature is defined as a predicted display deviation; and the control unit corrects the rotational position in a direction to reduce the predicted display deviation when the environmental temperature rises to the predicted deformation temperature or higher.

2. The head-up display device according to claim 1, wherein the control unit includes:

a correction execution block that executes the correction of the rotational position by a correction amount, which shifts the rotational position in the direction to reduce the predicted display deviation, when the environmental temperature rises to the predicted deformation temperature or higher; and a post-correction control block that controls the rotational position in accordance with the adjustment command, with the rotational position corrected by the correction execution block used as a reference.

3. The head-up display device according to claim 2, wherein the correction execution block executes the correction of the rotational position by the correction amount, which is variable based on a temperature correlation between the environmental temperature equal to or higher than the predicted deformation temperature and the predicted display deviation.

4. The head-up display device according to claim 3, wherein:

the correction execution block executes the correction of the rotational position by the correction amount, which is one of a plurality of correction amounts having different values respectively corresponding to a plurality of temperature ranges equal to or higher than the predicted deformation temperature based on the temperature correlation; and the one of the plurality of correction amounts corresponds to one of the plurality of temperature ranges to which the environmental temperature belongs.

5. The head-up display device according to claim 1, wherein the control unit executes the correction of the rotational position when the environmental temperature rises to the predicted deformation temperature or higher for the first time after the head-up display device is installed in the vehicle.

6. The head-up display device according to claim 1, wherein the control unit executes the correction of the rotational position when the environmental temperature in the vehicle rises to the predicted deformation temperature or higher after the vehicle stops.

7. The head-up display device according to claim 1, further comprising a temperature sensor that detects the environmental temperature, wherein:

the reduction gear mechanism includes a casing that accommodates therein the temperature sensor together with the specific gear; and the control unit executes the correction of the rotational position when the environmental temperature detected by the temperature sensor rises to the predicted deformation temperature or higher.

8. The head-up display device according to claim 1, wherein at least a tooth-shaped portion of the specific gear is formed from resin.

* * * * *